Oct. 7, 1958
A. ABGARIAN
2,855,208
COLLAPSIBLE GOLF BAG CARRIER
Filed March 23, 1955
3 Sheets-Sheet 1
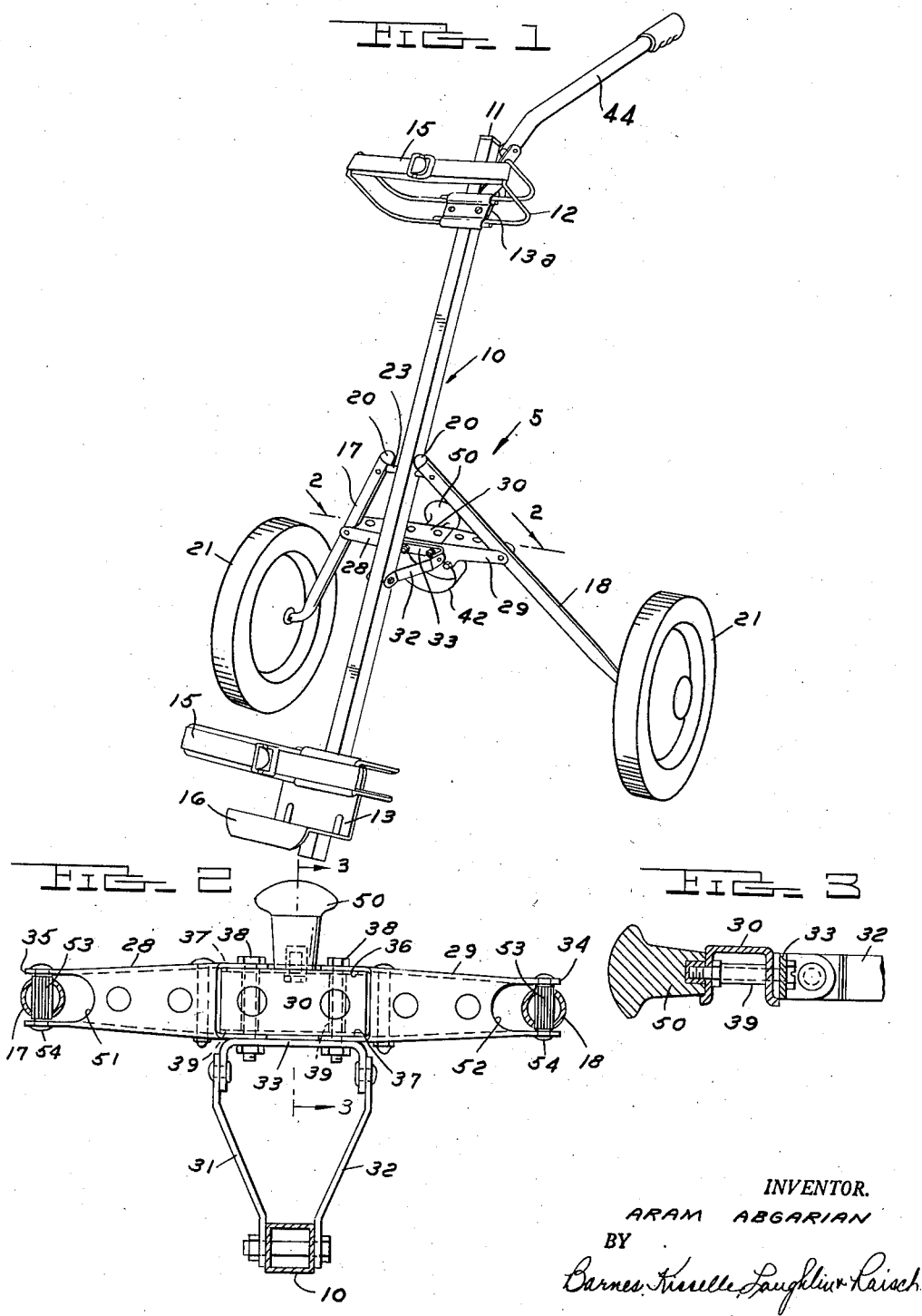
INVENTOR.
ARAM ABGARIAN
BY
Barnes, Kisselle, Laughlin & Raisch
ATTORNEYS

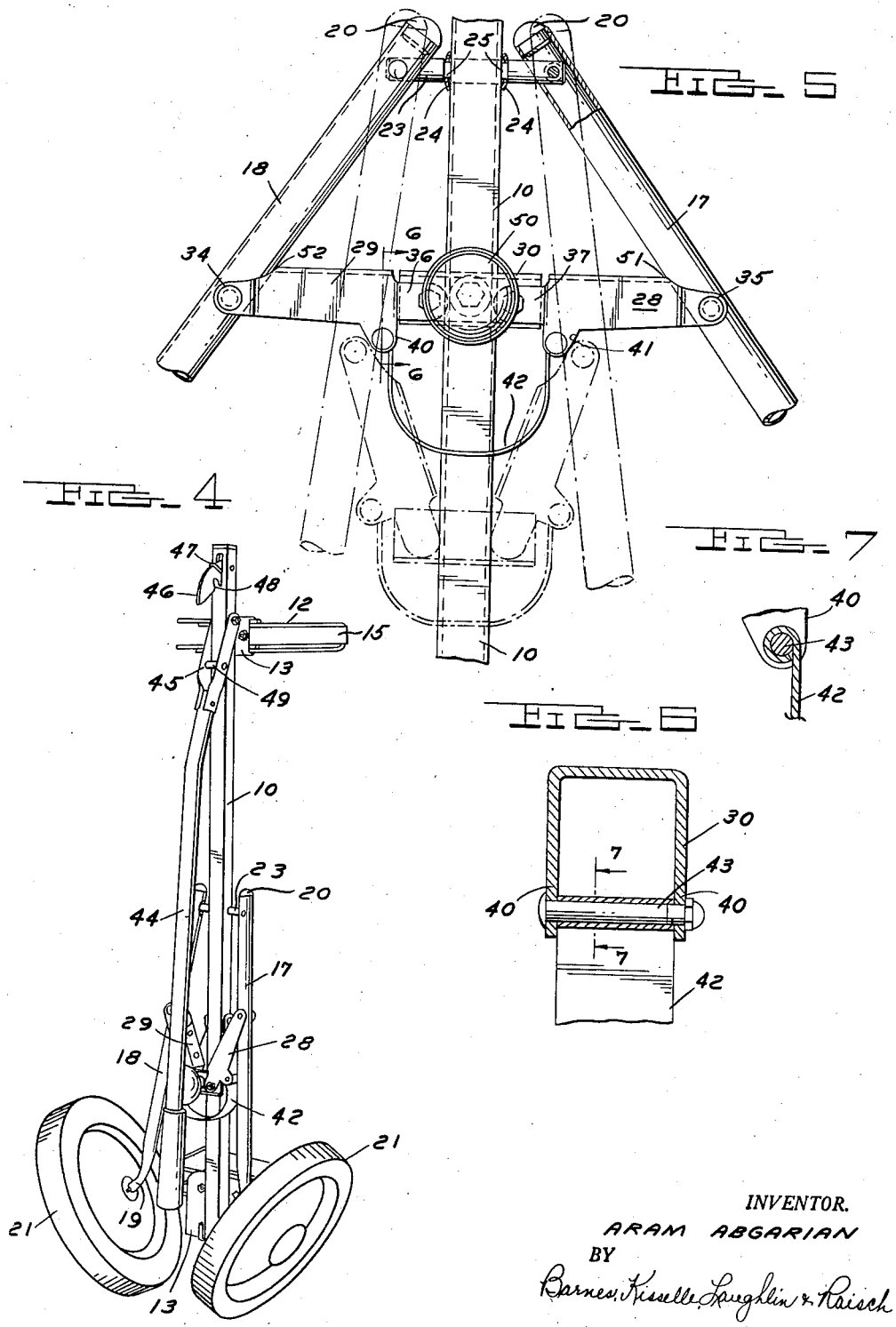

Oct. 7, 1958
A. ABGARIAN
2,855,208
COLLAPSIBLE GOLF BAG CARRIER
Filed March 23, 1955
3 Sheets-Sheet 3
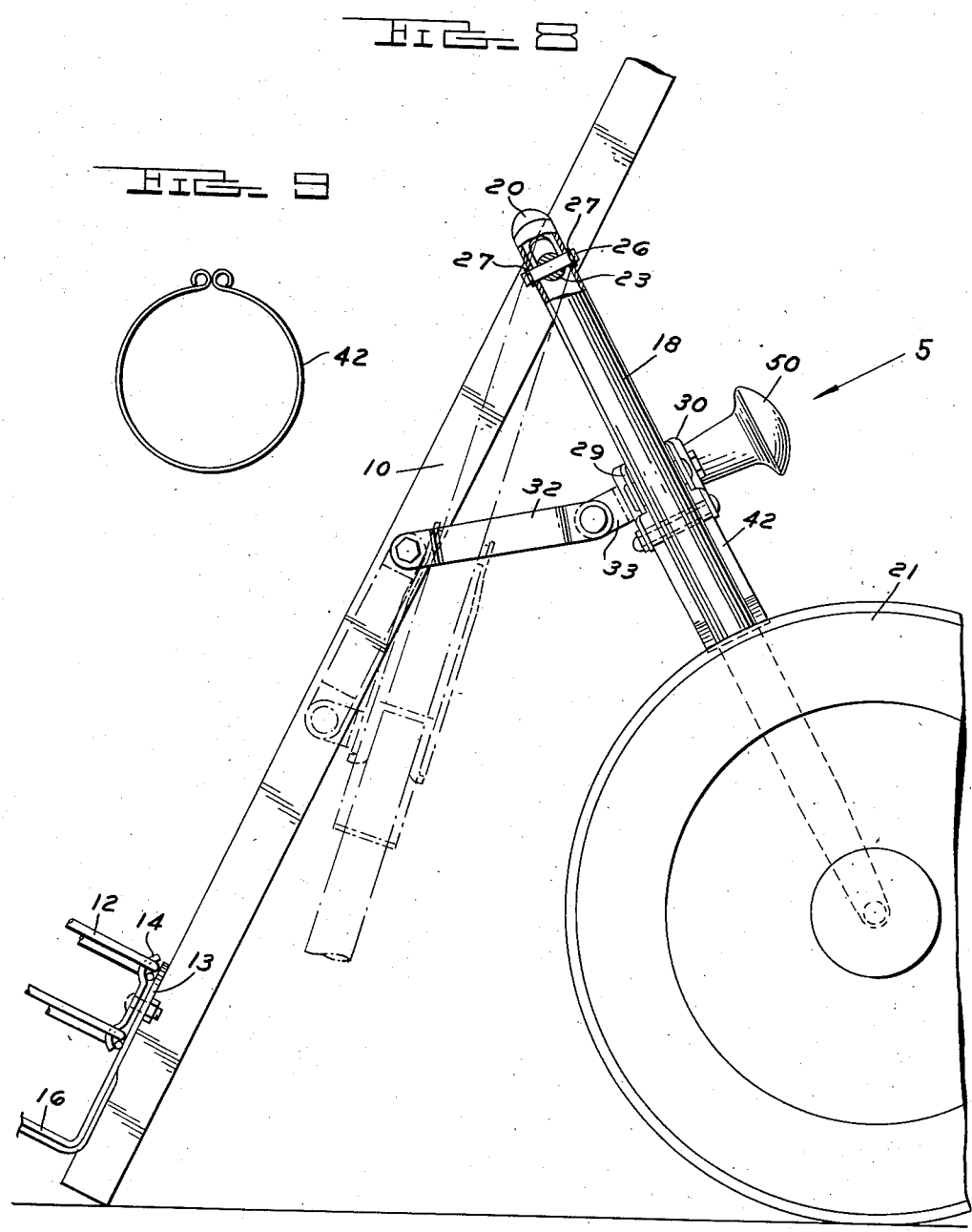
INVENTOR.
ARAM ABGARIAN
BY
Barness Kissell Laughlin & Raisch
ATTORNEYS United States Patent Office 2,855,208
Patented Oct. 7, 1958

2,855,208
COLLAPSIBLE GOLF BAG CARRIER
Aram Abgarian, Detroit, Mich.
Application March 23, 1955, Serial No. 496,175
10 Claims. (Cl. 280—41)

This invention relates to golf bag carriers and particularly to golf bag carriers of the collapsible type.

Golf bag carriers of the collapsible type conventionally consist of an upright support on which the bag is mounted by suitable means. In one type of such carrier, wheels are mounted on struts pivotally connected to the upright support and foldable into compact relationship with respect to the support.

It is an object of this invention to provide such a golf bag carrier which is light weight, economical to manufacture, and easily collapsed to a folded condition and extended to a stabilized operating condition.

It is a further object of the invention to provide such a golf bag carrier which includes yieldable means which act to maintain the golf bag carrier in both extended operating condition and collapsed condition.

Basically, the golf bag carrier of this invention comprises a frame or upright support having means thereon for mounting the golf bag. Wheels are mounted on struts which are in turn pivotally mounted for lateral and rearward movement with respect to the upright support. Links extend between the struts and yieldable means is provided in the form of a flat coil spring having its ends connected to the links for urging the links and, in turn, the struts either into extended operative position or into collapsed condition. The yieldable means, namely, the flat coil spring, is mounted in such relationship to the links that in moving to or from the collapsed condition, the mounting points pass the center pivoted connections of the links thus providing an urging force when the golf bag carrier is either in extended position or in collapsed condition.

In the drawings:

Fig. 1 is a perspective view of the golf bag carrier in extended operative position.

Fig. 2 is a fragmentary sectional view along the line 2—2 of Fig. 1.

Fig. 3 is a fragmentary sectional view along the line 3—3 of Fig. 2.

Fig. 4 is a perspective view of the golf bag carrier in collapsed condition.

Fig. 5 is a fragmentary view along a plane 5 in Figs. 1 and 3.

Fig. 6 is a fragmentary sectional view along the lines 6—6 of Fig. 5.

Fig. 7 is a fragmentary sectional view along the lines 7—7 in Fig. 6.

Fig. 8 is a fragmentary part sectional elevation of the golf bag carrier in extended position.

Fig. 9 is a plan view of the flat coil spring in repose.

Referring to Fig. 1, the golf bag carrier comprises an upright support 10 in the form of a straight tubular member having a square cross section and provided with a plug 11 in the upper end thereof. Means are provided along the upright support 10 for supporting the golf bag and include wire holders 12 bent in angular form and held in fixed relationship to the upright support 10 on plates 13 and 13a welded at longitudinally spaced points on the support. A clamp plate 14 is clamped to the plate 13 by means of nuts and bolts and includes humped portions which engage over the holders 12. The holders 12 may be laterally adjusted to accommodate different size golf bags. Belts 15 are looped through the ends of the holders for completing the means for mounting the golf bags. The plate 13 near the lower end of the upright support 10 is provided with an angle section 16 which supports the golf bag so that tube 10 is extended to rest on the ground (Fig. 8). The end of the upright support 10 projects beyond the angle section 16 and rests on the ground. The angle section 16 is thereby spaced from the ground to keep the golf bag from touching the ground or grass.

Struts 17, 18 are mounted for pivotal movement with respect to the upright support. The struts are preferably made of tubular material, the upper ends being closed by plugs 20 and the lower ends of which are drawn to form stub shafts 19 on which wheels 21, 22 are mounted.

Referring to Fig. 5, the upper ends of struts 17, 18 are mounted for pivotal movement with respect to the upright support 10 by means which include a short shaft 23 passing laterally through the upright support 10 and rotatably mounted therein by retaining rings 24 engaged in spaced apart grooves 25 in the shaft 23. As shown in Fig. 8, the ends of the shaft 23 extend through elongated openings in the ends of the struts and the struts are pivotally mounted on the ends of the shaft 23 by short pins 26 passing through the struts and the ends of the shaft 23 and held therein by retaining rings 27. In this manner, the struts may be pivoted laterally outwardly away from the support 10 and also in an arcuate path longitudinally of the support.

Means are provided for limiting the extended or outward movement of the struts and for providing a stable operating position for the golf bag carrier. As shown in Figs. 5 and 8, such means comprise links 28, 29 having their outer ends pivotally connected to the struts 18, 17 and their inner ends pivotally connected to a bracket 30. The links 28, 29 and bracket 30 limit the lateral movement of the struts and, in turn, of the wheels, outwardly away from the upright support. Arms 31, 32 are pivotally connected to the upright support and yoke 33 which is mounted on the strut bracket 30, as shown in Fig. 2. The arms serve to limit the rearward movement of the struts and, in turn, the wheels away from the upright support.

The links 28, 29 are generally U-shaped in cross section, the side walls being extended at each end to form spaced apart flanges 34, 35 at the outer ends of links 28, 29 and spaced apart flanges 36, 37 at the inner ends of these links. Struts 17, 18 are pivotally supported between flanges 35, 34, respectively. In order to facilitate the connection between the links and struts, splined bushings 53 extend through the struts between flanges 34, 35, as shown in Fig. 2, and rivets 54 pass through these bushings, struts and flanges of the links. Links 28, 29 are pivoted to the strut bracket 30 at flanges 37, 36, respectively. The bracket 30 is also U-shaped in cross section, as shown in Fig. 3. Bolts 38 passing through tubular spacers 39 extend through the bracket 30 and the flanges 36, 37, and also the yoke 33, to pivotally connect the links 28, 29 and bracket 30 and to fixedly mount yoke 33 on bracket 30. A knob 50 is mounted on the bracket 30 for facilitating the manual movement of the bracket 30 downwardly with respect to the upright support for collapsing the golf bag carrier, or upwardly for extending the struts 17, 18 to the operative position.

The links 28, 29 are provided with a pair of downwardly extending projections 40, 41, respectively, on which the ends of a flat coil spring 42 are mounted. The ends of spring 42 are bent around a pin 43 extending between the projections of each link (Figs. 6, 7). The spring 42 comprises a single convolute and in the reposed condition assumes the shape shown in Fig. 9. When mounted on links 28, 29, spring 42 is expanded and the tension thereby produced urges the ends of the springs towards each other. The ends of the spring are positioned below the pivotal connections between the links 28, 29 and the bracket 30, when the struts 17, 18 are in extended position, and the ends of the spring are positioned above these pivotal connections when the golf bag carrier is in collapsed condition (Fig. 4).

As shown in Figs. 1 and 4, the golf bag carrier is also provided with a handle 44 which is pivotally mounted on the upper end of the upright support. The handle 44 includes a bifurcated portion 45 by means of which it is pivotally mounted to the upright support. A latch 46 pivoted to the end of the upright support and held downwardly by spring 47 serves to hold the handle in extended position by means of a notch 48 in the latch which engages with pin 49 extending between the bifurcated portion 45 of the handle 44.

With the golf bag carrier in collapsed condition, as shown in Fig. 4, the carrier is extended to operative position first by moving the handle upwardly and causing it to lock in extended position by means of latch 46. The knob 50 is then pulled upwardly and an upward force is placed upon the bracket 30 causing the links 28, 29 and arms 31, 32 to be pivoted and moving the struts 17, 18 outwardly away from the support against the action of the spring 42. At the same time, the arms 31 and 32 move the bracket 30 and, in turn, struts 17, 18 rearwardly away from the upright support 10. As the bracket 30 is moved upwardly from the broken line to the full line position in Fig. 5, the ends of the spring are carried below the pivotal connections between links 28, 29 and bracket 30, the spring serving to assist the movement of the links and, in turn, the struts to extended position, thus insuring that the struts are fully extended. In the final fully extended position, the upper edges 51, 52 (Fig. 5) of the links 28, 29, contact the struts 18, 17 respectively, and maintain the links 28, 29 and bracket 30 in a substantially straight line.

When in fully extended position, the carrier may be moved along the ground by pushing the handle downwardly, shifting the weight of the golf bag and carrier into a position overlying the wheels, and pushing or pulling the carrier by means of the handle.

When it is desired to collapse the golf bag carrier, the knob 50 is grasped and a downward force is applied to the bracket 30 against the action of the spring 42, moving the struts inwardly and toward the upright support. As the ends of the spring 42 pass above the pivotal points of the links 28, 29 to the bracket 30, the spring serves to assist in moving the links and arms 31, 32 and, in turn, the struts to the fully collapsed condition (dotted lines in Figs. 4 and 8). The bag need not be removed from the carrier to collapse the carrier. It will be observed that links 28, 29 cooperate with spring 42 to form a spring toggle which serves to maintain the struts 17, 18 in either of the two positions to which they are shifted.

I claim:

1. A golf bag carrier comprising an upright support, means on said support for holding a golf bag, a pair of struts having the ends thereof pivotally mounted on said support at a point intermediate the top and bottom of the support, said struts being swingable to a position outwardly from said upright support and rearwardly from the golf bag when the bag is held on said support, means for guiding and limiting the rearward movement of said struts, wheels mounted on the ends of said struts, a pair of links, each said link being pivotally connected at one end to a respective strut and extending inwardly toward the other strut, said links having the other ends thereof operatively interconnected, spring means extending between and connected to said links in such a manner as to urge and maintain the struts in extended position when the struts are moved outwardly and to urge and maintain the struts in collapsed position when the struts are folded into adjacent relationship with the support.

2. A golf bag carrier comprising an upright support, means on said support for holding a golf bag, a pair of struts having the ends thereof pivotally mounted on said support at a point intermediate the top and bottom of the support, said struts being swingable to a position outwardly from said upright support and rearwardly from the golf bag when the bag is held on said support, means for guiding and limiting the rearward movement of said struts, wheels mounted on the ends of said struts, a pair of links, each said link being pivotally connected at the outer end thereof to a respective strut and extending inwardly toward the other strut, means pivotally interconnecting the inner ends of said links, a spring having one end thereof attached to one said link and the other end thereof attached to the other said link, the points of attachment of said spring to said links being above the pivotal connections of the inner ends of said links when the struts are in collapsed condition and below said pivotal connections when the struts are in laterally extending condition, thereby urging and maintaining the struts in collapsed condition when the struts are folded into adjacent relationship with the support and urging and maintaining the struts in extended position when the struts are moved outwardly away from the support.

3. The golf bag carrier set forth in claim 2 wherein said spring comprises a single convolute of a flat coil spring, the ends of said spring producing a compressive force therebetween when the spring is in repose.

4. The golf bag carrier set forth in claim 2 wherein each said link has a portion thereof adapted to contact its respective strut when the struts are moved outwardly away from the support thereby maintaining the links in stable extended position.

5. A golf bag carrier comprising an upright support, means on said support for holding a golf bag, a pair of struts having the ends thereof pivotally mounted on said support at a point intermediate the top and bottom of the support, said struts being swingable to a position outwardly from said upright support and rearwardly from the golf bag when the bag is held on said support, wheels mounted on the ends of said struts, a pair of links, each said link being pivotally connected at the outer end thereof to a respective strut and extending inwardly toward the other strut, a bracket to which the inner end of each link is pivotally connected, means supporting said bracket on said upright support and limiting the rearward movement of said struts, a spring having one end thereof attached to one said link and the other end thereof attached to the other said link, the points of attachment of said spring to said links being above the pivotal connections of the inner ends of said links to said bracket when the struts are in collapsed condition and below said pivotal connections when the struts are in laterally extending condition, thereby urging and maintaining the struts in collapsed condition when the struts are folded into adjacent relationship with the support and urging and maintaining the struts in extended position when the struts are moved outwardly away from the support.

6. The golf bag carrier set forth in claim 5 wherein said spring comprises a single convolute of a flat coil spring.

7. The golf bag carrier set forth in claim 6 including a knob mounted on said bracket and adapted to be gripped for facilitating the movement of said bracket when moving said struts to operative position or collapsed position.

8. The golf bag carrier set forth in claim 5 wherein said means for supporting said bracket on said upright support and for limiting the rearward movement of said struts comprises a pair of arms, one end of each said arm being pivotally connected to the upright support and the other end of said arm being pivotally connected to said bracket.

9. The golf bag carrier set forth in claim 5 wherein each said link is channel shaped in cross section and has outwardly extending flanges between which its respective strut is disposed and a pin passing through the flanges and the strut for pivotally connecting the link to the strut.

10. The golf bag carrier set forth in claim 9 wherein each said link has a portion thereof adapted to contact its respective strut when the golf bag carrier is in extended position thereby maintaining the links and bracket in stable extended position.

References Cited in the file of this patent

UNITED STATES PATENTS

| | | |
|---|---|---|
| 2,326,482 | Moffitt | Aug. 10, 1943 |
| 2,443,847 | Williamson | June 22, 1948 |
| 2,563,033 | Greig | Aug. 7, 1951 |
| 2,626,814 | Chamberlin | Jan. 27, 1953 |